(12) United States Patent
Paradise et al.

(10) Patent No.: US 11,303,742 B2
(45) Date of Patent: Apr. 12, 2022

(54) DISPLAY FRAME FOR A MOBILE DEVICE

(71) Applicant: MOTOROLA MOBILITY LLC, Chicago, IL (US)

(72) Inventors: Michael F. Paradise, Chicago, IL (US); Thomas E. Gitzinger, Jr., Libertyville, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/928,731

(22) Filed: Jul. 14, 2020

(65) Prior Publication Data

US 2022/0021760 A1  Jan. 20, 2022

(51) Int. Cl.
*H04M 1/02* (2006.01)

(52) U.S. Cl.
CPC ....... *H04M 1/0268* (2013.01); *H04M 1/0216* (2013.01); *H04M 1/0252* (2013.01)

(58) Field of Classification Search
CPC ............. H04M 1/0268; H04M 1/0216; H04M 1/0252; H04M 1/0235; H04M 1/0277; H04M 2201/38; H04M 1/0022; H04M 1/0222; H04M 1/0225; H04M 1/0227; H04M 1/0229; H04M 1/0231; H04M 1/0233; G06F 1/1652; G06F 1/1643; G06F 1/1624; H05K 5/0017
See application file for complete search history.

(56) References Cited

U.S. PATENT DOCUMENTS

| | | | | |
|---|---|---|---|---|
| 9,468,118 | B1* | 10/2016 | Peters | B32B 5/245 |
| 10,474,196 | B2* | 11/2019 | Yeh | G06F 1/1641 |
| 10,860,056 | B2* | 12/2020 | Watamura | G06F 1/1616 |
| 2018/0150112 | A1* | 5/2018 | Aoki | G06F 1/1618 |

* cited by examiner

*Primary Examiner* — Ankur Jain
*Assistant Examiner* — Angelica M Perez
(74) *Attorney, Agent, or Firm* — Isidore PLLC

(57) ABSTRACT

A display frame for a mobile device includes a first display frame section and a second display frame section. A flexible hinge section couples the first display frame section and the second display frame section. The flexible hinge section enables the first and second display frame sections to bend relative to each other. A first wall is contiguous with the first display frame section, the flexible hinge section, and the second display frame section. The first wall is integral to the first display frame section, the flexible hinge section, and the second display frame section.

17 Claims, 13 Drawing Sheets

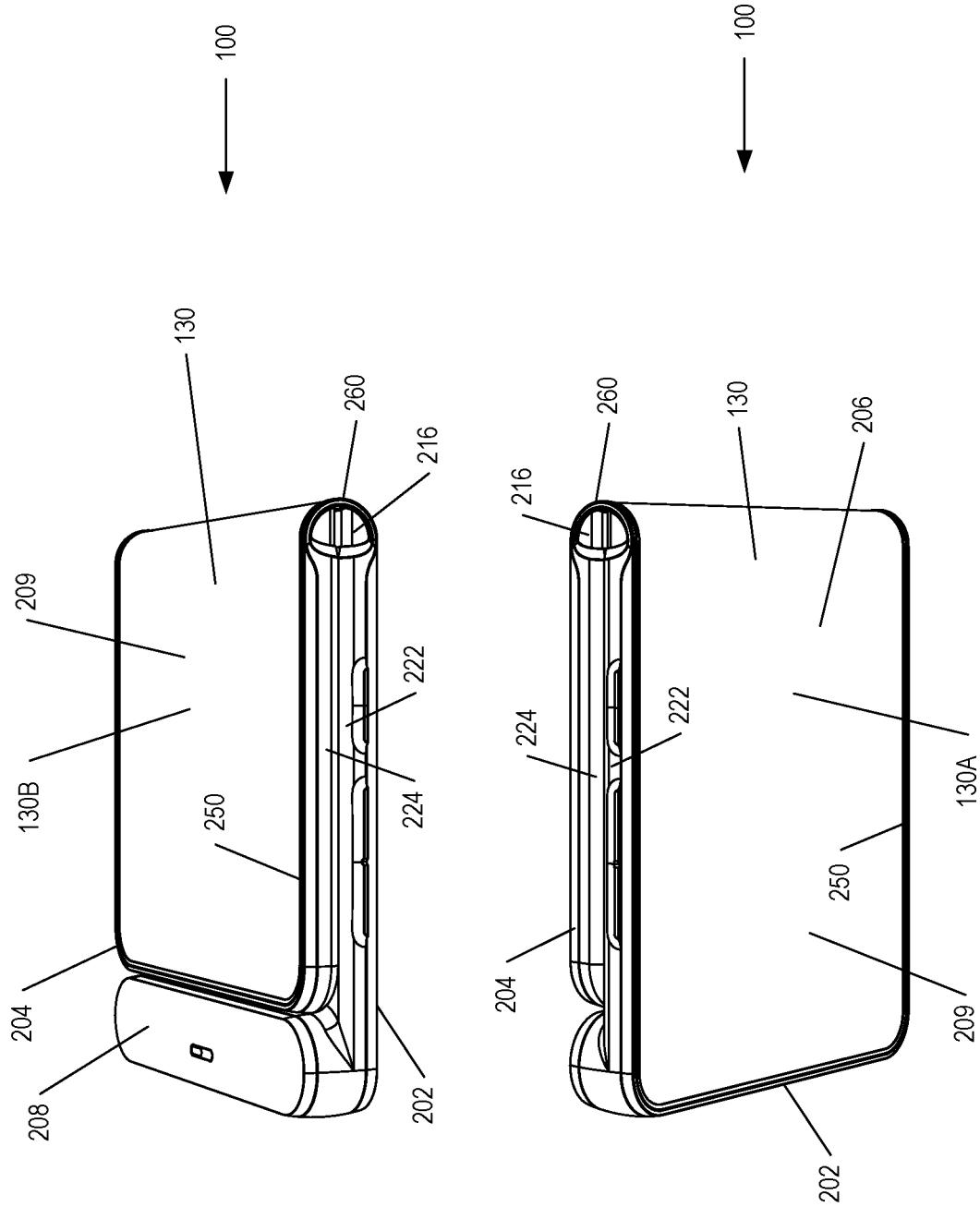

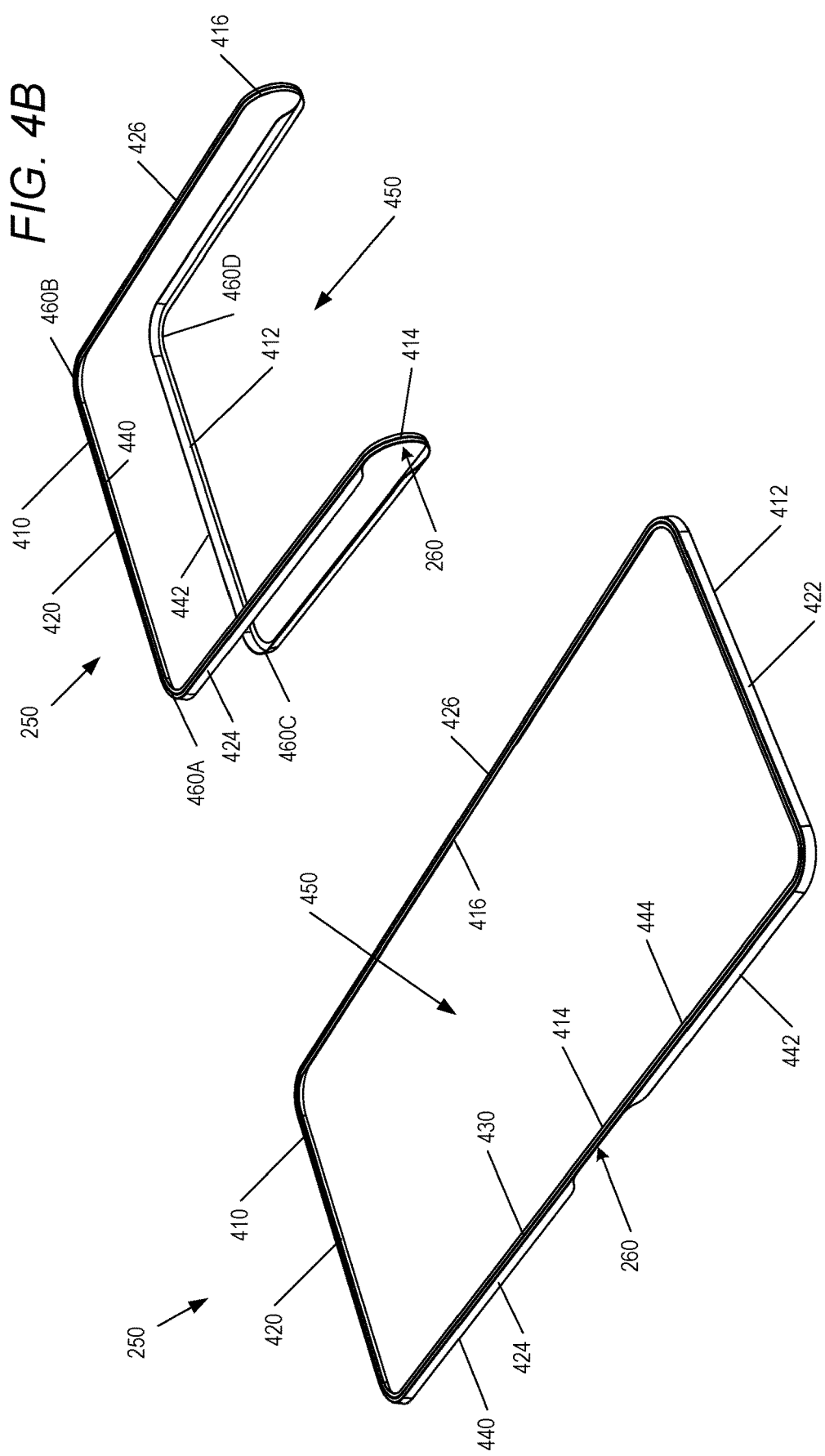

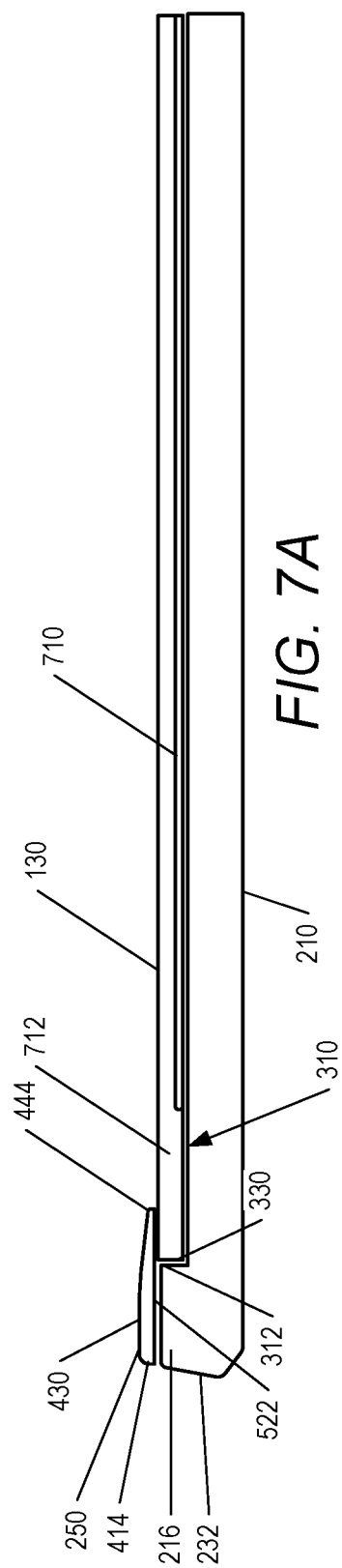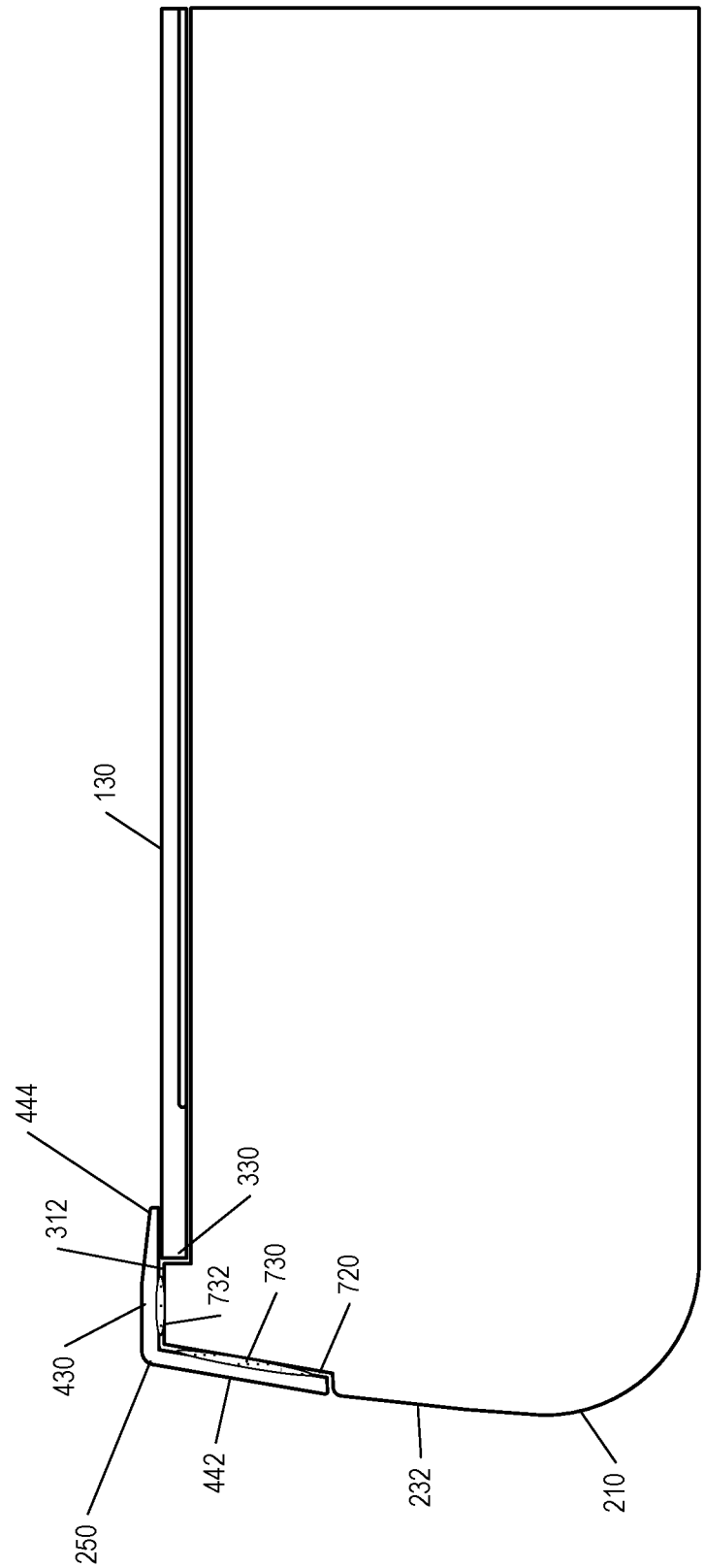

DISPLAY FRAME FOR A MOBILE DEVICE

BACKGROUND

1. Technical Field

The present disclosure generally relates to mobile devices and in particular to a display frame for a mobile device.

2. Description of the Related Art

Personal electronic devices, such as cell phones, smartphones and other mobile devices enjoy widespread use in today's society. Smartphones can use organic light emitting diode (OLED) displays. OLED displays include an organic compound that emits light when an electrical current is applied. OLED displays can be designed in an edge to edge manner where the size of the OLED display is maximized to take up almost the entire front of the smartphone.

A flexible organic light-emitting diode (FOLED) display is a type of OLED display that uses a flexible plastic substrate on which an electro-luminescent organic compound is deposited. The flexible plastic substrate enables the FOLED display to be bent or folded into various shapes and positions. The FOLED can be operated as a display in the various bent and folded shapes and positions.

The edges of FOLED displays are susceptible to damage when a smartphone is dropped. The edges of FOLED displays are also susceptible to damage by users peeling the edges of the FOLED display. Protecting the edges of FOLED displays is important for the long term reliable function of smartphones equipped with FOLED displays.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2E is a rear perspective view of the mobile device of FIG. 2B in a folded position, according to one or more embodiments;

FIG. 2F is a front perspective view of the mobile device of FIG. 2A in a folded position, according to one or more embodiments;

FIG. 4A is an example illustration of a display frame in an unfolded position, according to one or more embodiments;

FIG. 4B is an example illustration of a display frame in a folded position, according to one or more embodiments;

FIG. 7A is a partial cross-sectional view of a first example mobile device taken along section line A-A of FIG. 2A, according to one or more embodiments;

FIG. 7B is a partial cross-sectional view of a first example mobile device taken along section line B-B of FIG. 2A, according to one or more embodiments;

DETAILED DESCRIPTION

Figure 1:
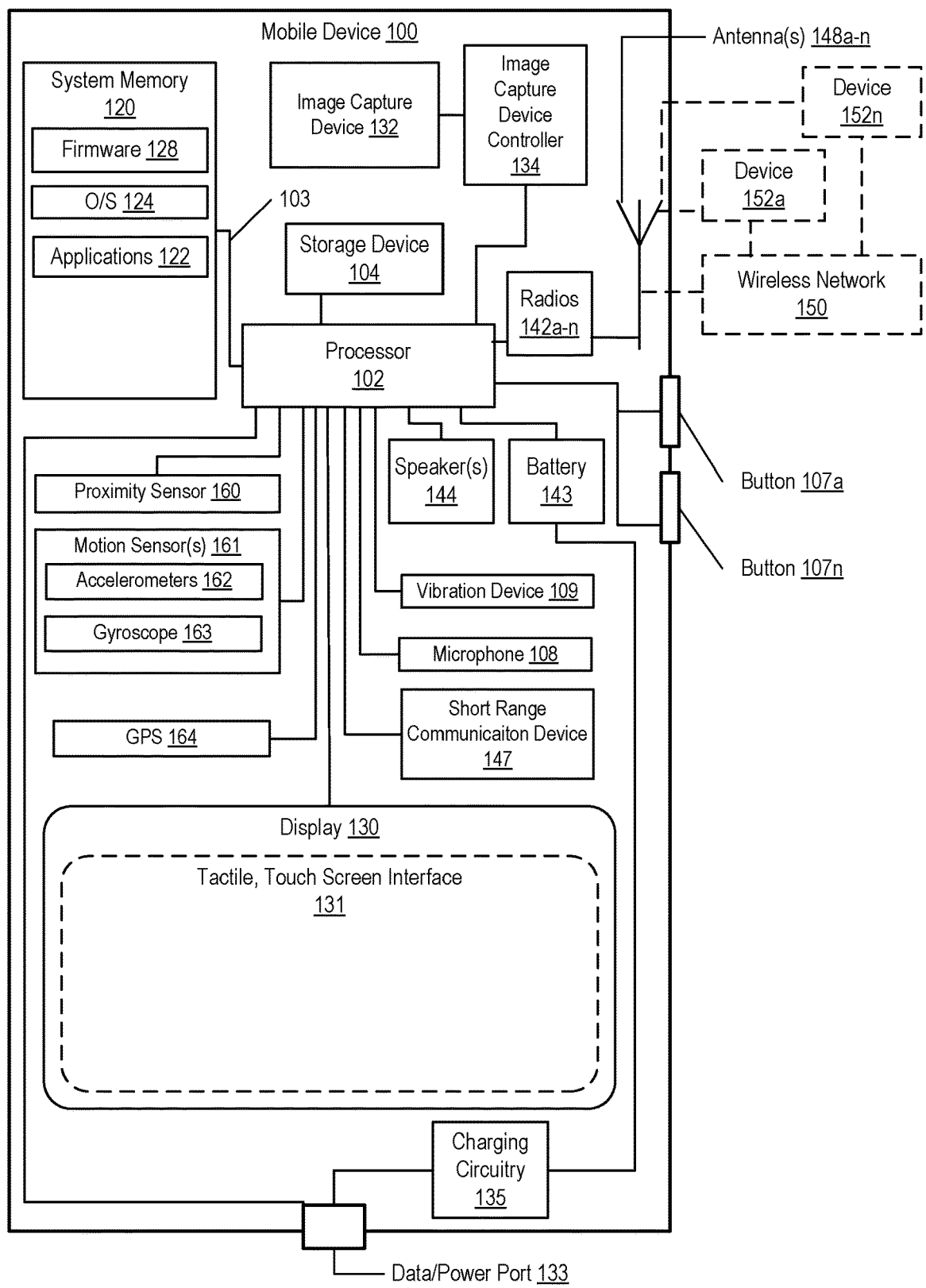
FIG. 1 depicts an example mobile device within which various aspects of the disclosure can be implemented, according to one or more embodiments.

The illustrative embodiments provide a mobile device, a display frame for the mobile device, and a method for making the mobile device. The display frame includes a first display frame section and a second display frame section. A flexible hinge section couples the first display frame section and the second display frame section. The flexible hinge section enables the first and second display frame sections to bend relative to each other. A first wall is contiguous with the first display frame section, the flexible hinge section, and the second display frame section. The first wall is integral to the first display frame section, the flexible hinge section, and the second display frame section. The first wall in the flexible hinge section allows the flexible hinge section to bend.

According to another embodiment, a mobile device includes a housing and a flexible display coupled to the housing. The flexible display has an outer peripheral edge. A display frame is coupled to the housing. The display frame includes a first display frame section and a second display frame section. A flexible hinge section couples the first display frame section and the second display frame section. The flexible hinge section enables the first and second display frame sections to bend relative to each other. A first wall is contiguous with the first display frame section, the flexible hinge section and the second display frame section. The first wall is integral to the first display frame section, the flexible hinge section, and the second display frame section. The first wall in the flexible hinge section allows the flexible hinge section to bend.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device (100, FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts example mobile device 100 within which various aspects of the disclosure can be implemented, according to one or more embodiments. Examples of such mobile devices include, but are not limited to, a laptop computer, a notebook computer, a mobile phone, a digital camera, a tablet computer/device, and a smart-watch, etc. Mobile device 100 includes processor 102, which is communicatively coupled to storage device 104, system memory 120, display 130, image capture device controller 134, wireless communication radios 142a-n, and other components described herein. The components of mobile device 100 are communicatively coupled to each other by a system interconnect 103. System interconnect 103 can a bus or wired connection. System interconnect 103 has multiple connections. Only one of the connections of system interconnect 103 is labeled in FIG. 1.

System memory 120 may be a combination of volatile and non-volatile memory, such as random access memory (RAM) and read-only memory (ROM). System memory 120 can store program code or similar instructions associated with applications 122, an operating system 124 and firmware 128. Processor 102 loads and executes program code stored in system memory 120. Examples of program code that may be loaded and executed by processor 102 include program code associated with applications 122.

Display 130 can be a flexible organic light emitting diode (FOLED) display that is moveable or bendable into various shapes. In the illustrated embodiments, display 130 is a touch screen device that includes a tactile, touch screen interface 131 that allows a user to provide tactile/touch input to or control mobile device 100 by touching the display screen.

In one embodiment, image capture device 132 is communicatively coupled to image capture device controller 134, which is communicatively coupled to processor 102. Image capture device 132 can capture images that are within the field of view of image capture device 132.

Radios 142a-n are coupled to antennas 148a-n. Radios 142a-n and antennas 148a-n allow mobile device 100 to communicate wirelessly with external devices 152a-n via wireless network 150. In one embodiment, external devices 152*a-n* can be remote radios (i.e., wireless signal transmitters and receivers) located at various cellular communication towers.

Mobile device 100 can further include data/power port 133, which is connected with processor 102 and charging circuitry 135. Charging circuitry 135 enables external charging of battery 143 via power input through data/power port 133. Mobile device 100 further includes microphone 108, vibration device 109, one or more speakers 144, and one or more buttons 107*a-n*. Buttons 107*a-n* may provide controls for volume, power, and image capture device 132, etc.

Mobile device 100 further includes proximity sensor 160 and motion sensor(s) 161 that are communicatively coupled to processor 102. Proximity sensor 160 can be an infrared (IR) sensor that detects the presence of a nearby object. Motion sensor(s) 161 can include one or more accelerometers 162 and gyroscope 163. Motion sensor(s) 161 can detect movement of mobile device 100 and provide, to processor 102, motion data that indicate the spatial orientation and movement of mobile device 100.

Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Mobile device 100 further includes additional components, such as global positioning system (GPS) module 164 and short-range communication device 147. GPS module 164 can receive location and time data from GPS satellites. Short-range communication device 147 is a low powered transceiver that can wirelessly communicates with other devices. Short-range communication device 147 can be one or more of a variety of devices, such as a near field communication (NFC) device, a Bluetooth device, or a wireless fidelity (Wi-Fi) device.

Figure 2A:
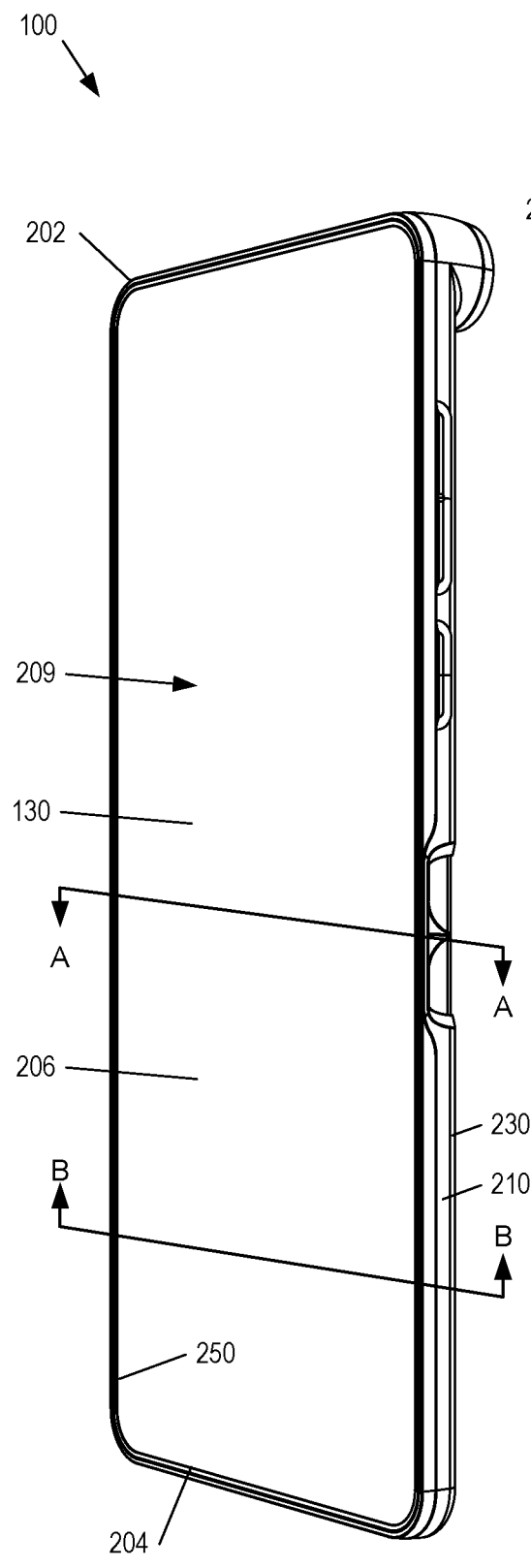
FIG. 2A is a front perspective view of a mobile device in an open position, according to one or more embodiments.

In the description of each of the following figures, reference is also made to specific components illustrated within the preceding figure(s). FIGS. 2A-F illustrate three dimensional views of mobile device 100. With reference now to FIG. 2A, a front view of mobile device 100 with a FOLED display 130 in an open position is shown. Mobile device 100 has a top half 202, bottom half 204, front side 206. FOLED display 130 is designed in an edge to edge manner that occupies substantially all of the front side 206 of mobile device 100. FOLED display 130 has a front surface 209.

Figure 2B:
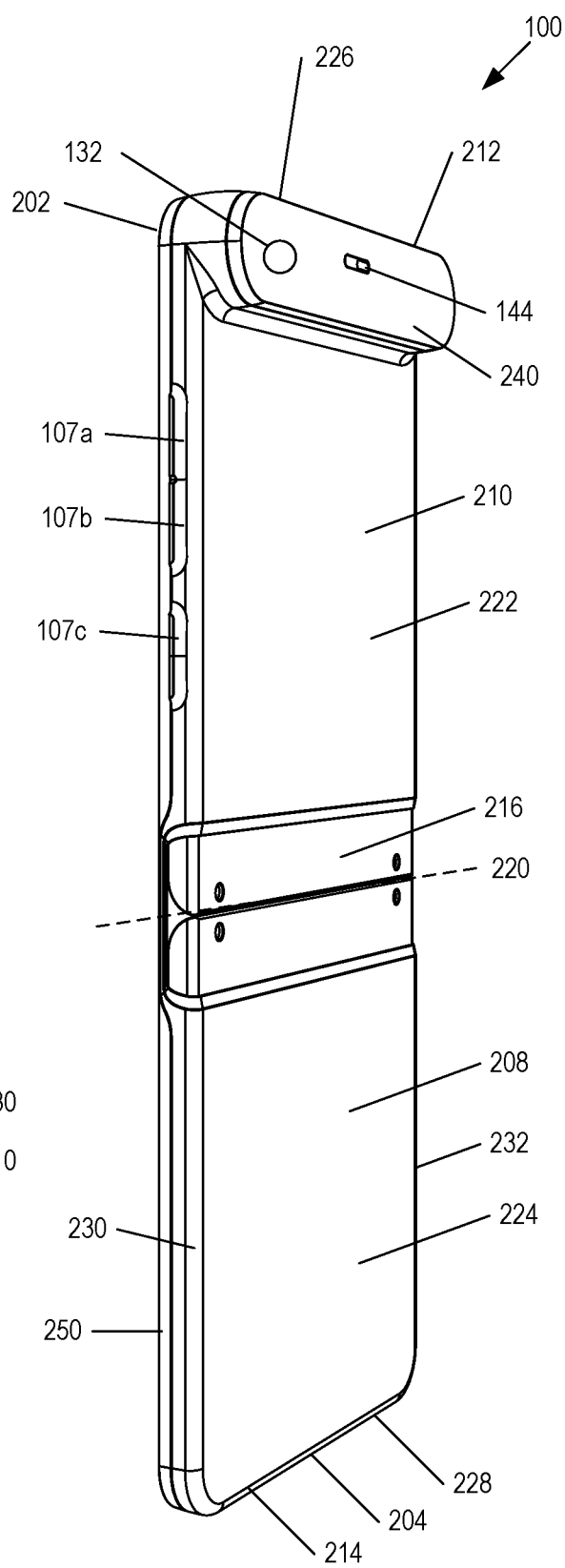
FIG. 2B is a rear perspective view of the mobile device of FIG. 2A in an open position, according to one or more embodiments.

With additional reference to FIG. 2B, a rear view of mobile device 100 in an open position is shown. Mobile device 100 includes a housing 210 that contains the functional and operational components of mobile device 100. Housing 210 has a back side 208, top housing section 212 and a bottom housing section 214 that are connected by a housing hinge section 216. Housing hinge section 216 enables the top housing section 212 and the bottom housing section 214 to rotate relative to each other about an axis of rotation 220.

Housing 210 further includes a top outer surface 222, bottom outer surface 224, top side 226, bottom side 228, right side 230 and left side 232. Several buttons 107*a*, 107*b* and 107*c* are mounted to right side 230. Housing 210 also includes a head section 240 that is located at the end of top housing section 212. Head section 210 can contain various components of mobile device 100 such as image capture device 132 and speaker 144. Mobile device 100 includes a display frame 250 that is mounted over FOLED display 130 and coupled to housing 210. Display frame 250 can protect the edges of FOLED display 130 from damage.

Figure 2C:
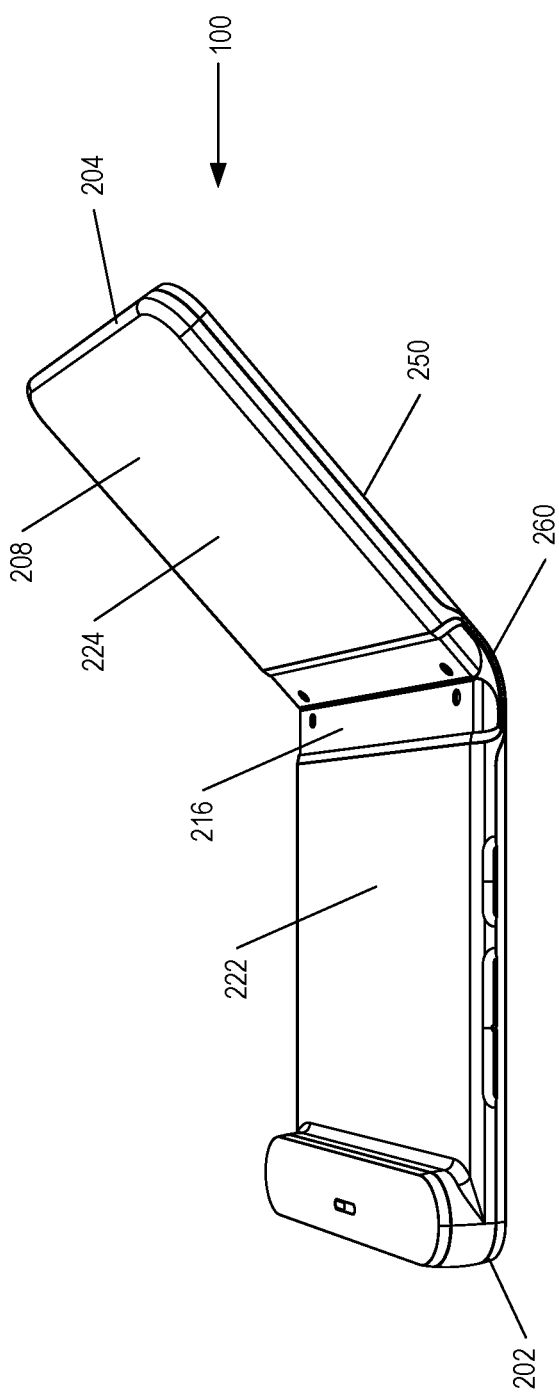
FIG. 2C is a rear perspective view of the mobile device of FIG. 2B in a partially folded position, according to one or more embodiments.

Referring to FIG. 2C, mobile device 100 is shown in a partially closed or partially folded position. In FIG. 2C, mobile device 100 is viewed from the perspective of back side 208. Mobile device 100 can be bent or folded about housing hinge section 216. A user can bend top half 202 and bottom half 204 towards each other by rotating top half 202 and/or bottom half 204 towards each other about housing hinge section 216. As top half 202 and bottom half 204 bend towards each other, top outer surface 222 and bottom outer surface 224 of housing 210 also bend toward each other. As top half 202 and bottom half 204 bend towards each other, a flexible hinge section 260 of display frame 250 also bends.

Figure 2D:
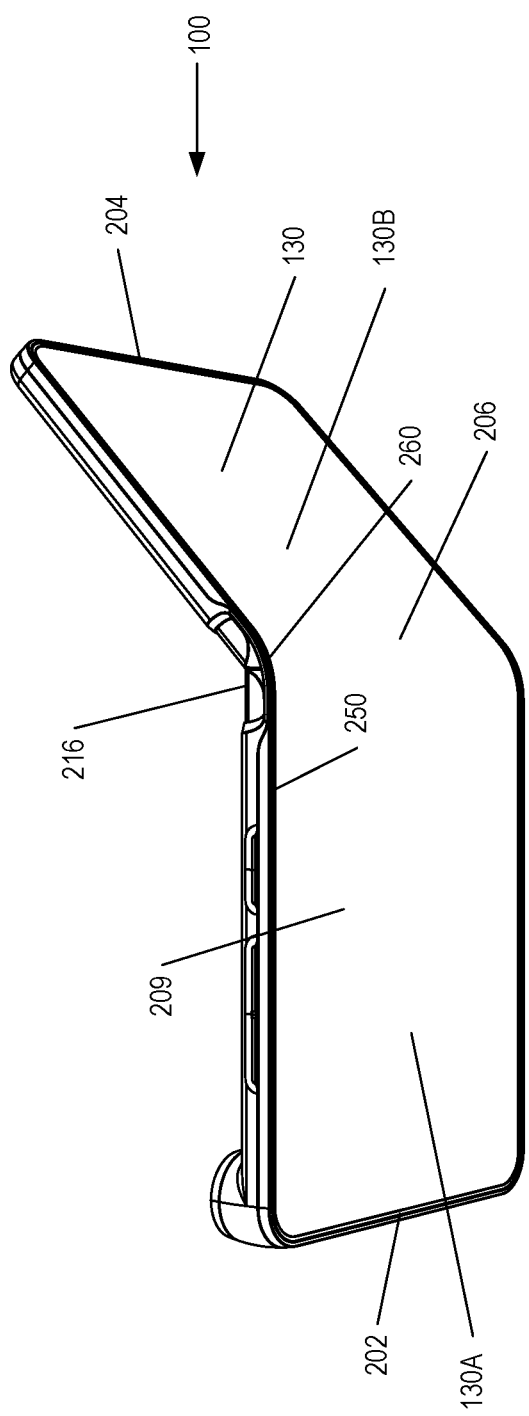
FIG. 2D is a front perspective view of the mobile device of FIG. 2A in a partially folded position, according to one or more embodiments.

Turning to FIG. 2D, mobile device 100 is shown in a partially closed or partially folded position. In FIG. 2D, mobile device 100 is viewed from the perspective of front side 206. As top half 202 and bottom half 204 bend towards each other, FOLED display 130 also bends, defining a top display half 130A and a bottom display half 130B. As top half 202 and bottom half 204 bend towards each other, flexible hinge section 260 of display frame 250 also bends.

With reference to FIG. 2E, mobile device 100 is shown in a fully closed or fully folded position. In FIG. 2E, mobile device 100 is viewed from back side 208. FOLED display 130, housing 210 and display frame 250 can bend into the fully closed position. In the fully folded position, top half 202 and bottom half 204 are juxtaposed to each other. After being fully folded, top outer surface 222 and bottom outer surface 224 of housing 210 are opposed to and face each other. In FIG. 2E, top display half 130B and a portion of front surface 209 of display 130 faces upwards and flexible hinge section 260 is in a fully folded position.

Referring to FIG. 2F, mobile device 100 is shown in a fully folded position. In FIG. 2F, mobile device 100 is viewed from front side 206. In the fully folded position, top display half 130A and a portion of front surface 209 of display 130 faces downwards. According to one aspect of the disclosure, when fully folded, all of display 130 (i.e., both top display half 130A and bottom display half 130B) faces outwardly such that both halves can be viewed by a user. Thus, all of front surface 209 of display 130 can be viewed while mobile device 100 is in both the unfolded and the folded positions. Both top display half 130A and bottom display half 130B can be viewed while mobile device 100 is in the folded position by a user turning mobile device 100 over.

Mobile device 100 can be bent from a fully closed or fully folded position to an open or unfolded position. Flexible hinge section 260 of display frame 250 enables mobile device 100 to bend between unfolded and folded positions and between folded and unfolded positions. Flexible hinge section 260 of display frame 250 also enables mobile device 100 to be bent to intermediate positions between unfolded and fully folded. Flexible hinge section 260 can stop motion and hold at various intermediate positions or angles between unfolded and folded. Flexible hinge section 260 can be referred to as a "free stop" hinge that is position-able to hold top half 202 and bottom half 204 at a stop position.

Figure 3:
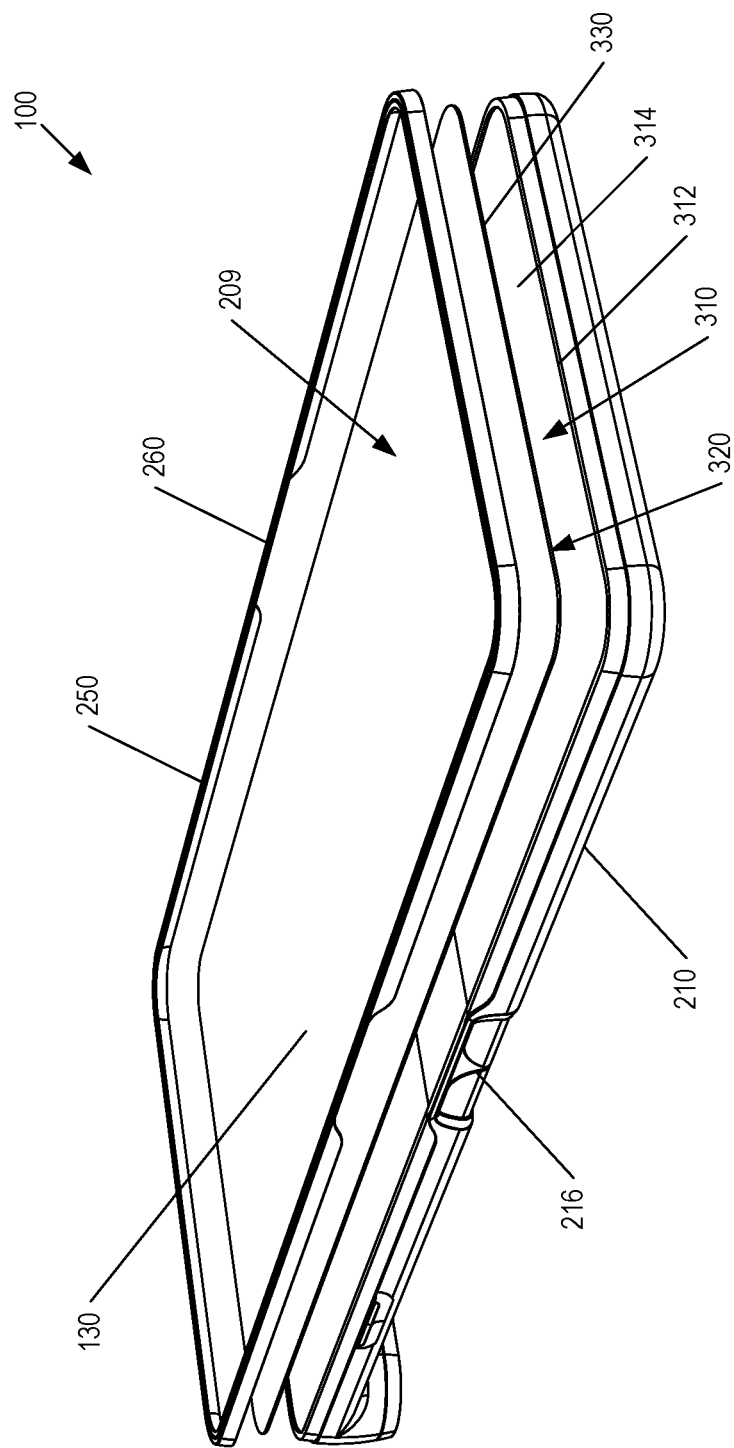
FIG. 3 is an exploded view a mobile device, according to one or more embodiments.

FIG. 3 illustrates an exploded view of mobile device 100. Housing 210 further includes a cavity 310 that is defined by a rim 312 that extends upwardly from the sides 226, 228, 230 and 232 of housing 210. Housing 210 also includes an inner surface 314. FOLED display 130 has a front surface 209, a rear surface 320, and outer peripheral edges 330. FOLED display 130 is mounted in cavity 310 with rear surface 320 of FOLED display 130 adjacent to inner surface 314 and outer peripheral edges 330 adjacent to rim 312. FOLED display 130 can be retained in cavity 310 via an adhesive 340 between rear surface 320 and inner surface 314. Display frame 250 is mounted over FOLED display 130 and coupled to housing 210. Display frame 250 at least partially surrounds and covers peripheral edges 330 of FOLED display 130. Display frame 250 protects the peripheral edges 330 of FOLED display 130 from damage.

FIG. 4A illustrates display frame 250 in an unfolded position. Display frame 250 is generally rectangular in shape and includes an upper display frame section 410 and a lower display frame section 412. Flexible hinge section 260 couples the upper display frame section 410 and the lower display frame section 412. Flexible hinge section 260 enables the upper display frame section 410 and the lower display frame section 412 to bend relative to each other. Flexible hinge section 260 includes hinges 414 and 416. In the unfolded position, hinges 414 and 416 have a generally straight shape.

Display frame 250 further includes top side 420, bottom side 422, left side 424, and right side 426. An upper wall 430 is contiguous or continuous with the upper display frame section 410, the flexible hinge section 260, and the lower display frame section 412. The upper wall 430 is integral to the upper display frame section 410, the flexible hinge section 260, and the lower display frame section 412. Upper wall 430 extends along the upper display frame section 410 and the lower display frame section 412.

Display frame 250 further includes side walls 440 and 442. Side wall 440 extends generally perpendicularly downward from upper wall 430 in the upper display frame section 410. Side wall 442 extends generally perpendicularly downwards from upper wall 430 in the lower display frame section 412. A peripheral inner edge 444 is defined along the inside of upper wall 430. Peripheral inner edge 444 defines a central opening 450 in display frame 250. Peripheral inner edge 444 surrounds central opening 450. Central opening 450 is integral to the upper display frame section 410, the lower display frame section 412, and the flexible hinge section 260.

With additional reference to FIG. 4B, display frame 250 is shown in a fully folded position. In the fully folded position, hinges 414 and 416 are generally U-shaped. When fully folded, the upper display frame section 410 and the lower display frame section 412 are opposed to each other with side walls 440 and 442 facing each other. Display frame 250 further includes four corners 460A, 460B, 460C and 460D. Corners 460A and 460B are located in upper display frame section 410 and corners 460C and 460D are located in lower display frame section 412.

According to one aspect of the disclosure, display frame 250 can be formed by a metal injection molding process. Metal injection molding is a process using fine powdered metal mixed with a binder material to create a feedstock that is shaped and solidified using injection molding. The metal injection molding process allows complex parts to be shaped in a single step. After molding, the part undergoes a conditioning operation called de-binding to remove the binder and to make the powder denser. In one embodiment, the metal used to form display frame 250 can be an alloy of nickel and titanium.

Figure 5B:
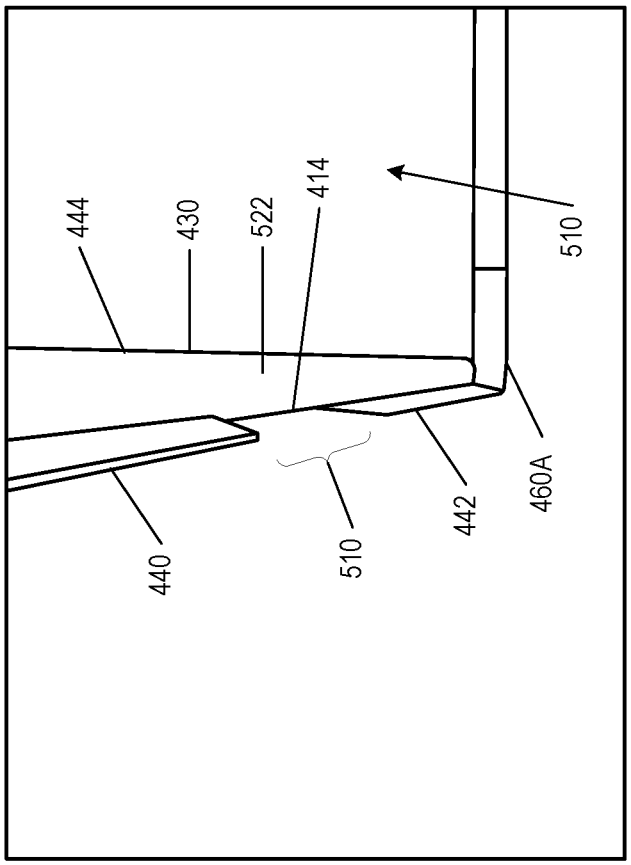
FIG. 5B is an example illustration of an enlarged bottom view of a display frame hinge, according to one or more embodiments.
Figure 5A:
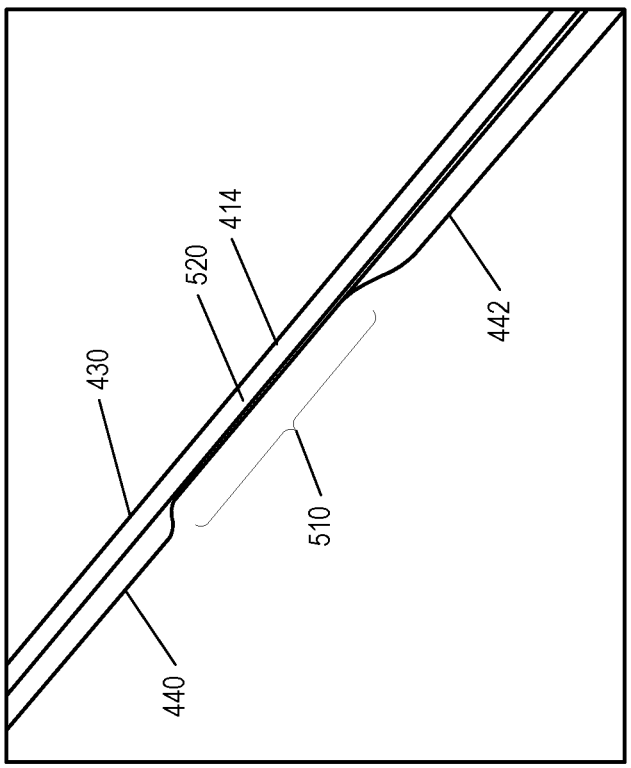
FIG. 5A is an example illustration of an enlarged top view of a display frame hinge, according to one or more embodiments.

Referring to FIG. 5A, a top view of hinge 414 in an unfolded position is shown. Hinge 414 is located between side walls 440 and 442 and is integral with upper wall 430. A gap 510 is located between side walls 440 and 442. With additional reference to FIG. 5B, a bottom view of hinge 414 in an unfolded position is shown. Side walls 440 and 442 extend generally perpendicularly downward from upper wall 430. Peripheral inner edge 444 of upper wall 430 is shown facing central opening 450. Hinge 414 further includes an outer surface 520 (FIG. 5A) and an inner surface 522 (FIG. 5B).

Figure 6B:
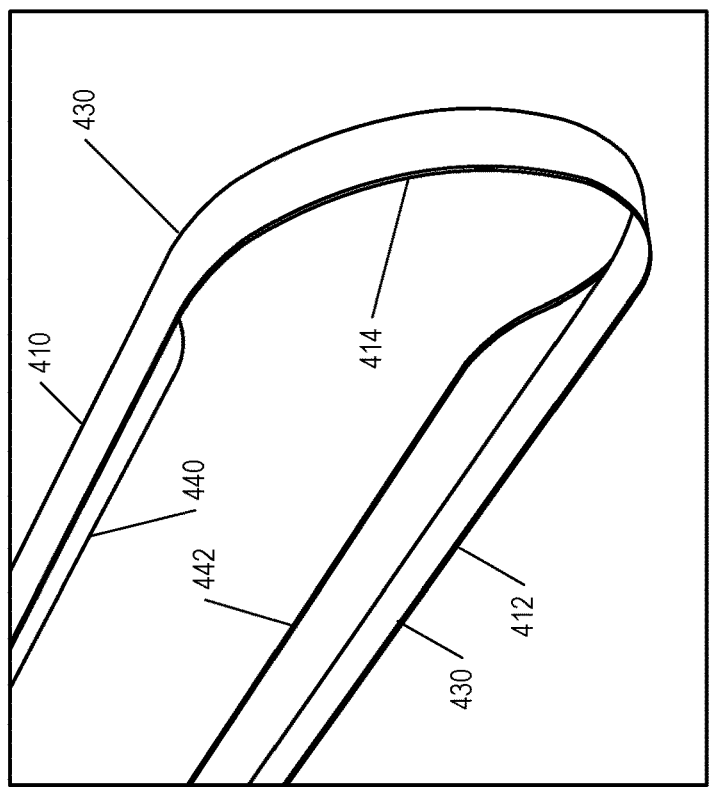
FIG. 6B is an example illustration of an enlarged inside view of a display frame hinge, according to one or more embodiments.
Figure 6A:
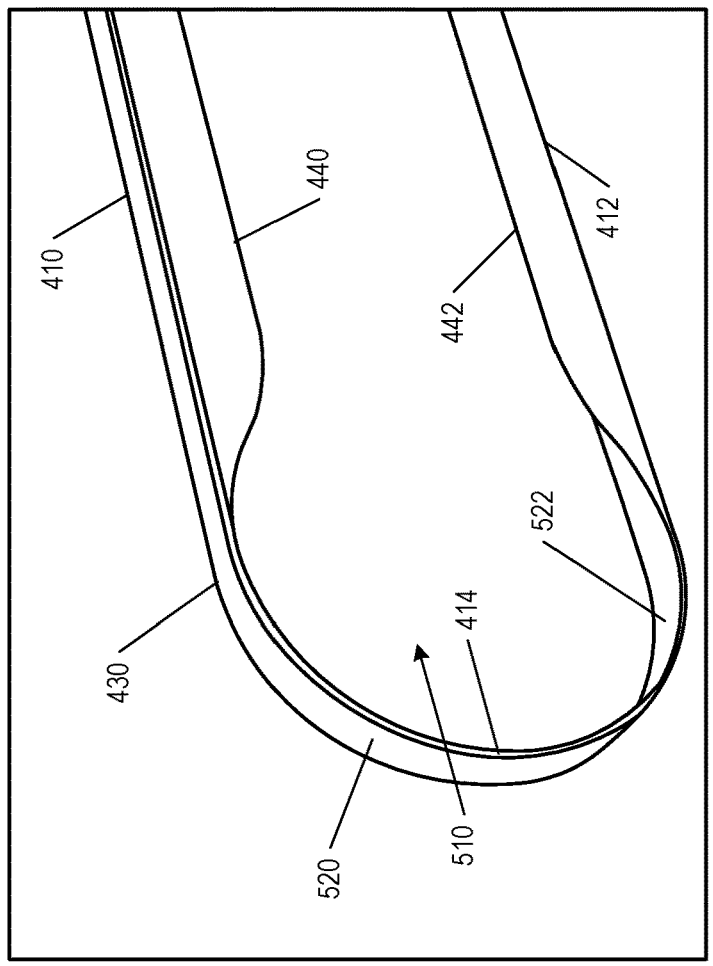
FIG. 6A is an example illustration of an enlarged outside view of a display frame hinge, according to one or more embodiments.

Referring to FIG. 6A, an outside view of hinge 414 in a fully folded position is shown. In the fully folded position, hinge 414 is generally U-shaped. Hinge 414 has a flat cross-section. The flat cross-section of hinge 414 enables the hinge to be flexible and to bend. Similarly, hinge 414 (FIG. 4B) and flexible hinge section 260 (FIG. 4B) also have flat cross-sections that enable flexing and bending.

With additional reference to FIG. 6B, an inside view of hinge 414 in a fully folded position is shown. Upper display frame section 410 is formed by the combination of upper wall 430 and side wall 440. Lower display frame section 412 is formed by the combination of upper wall 430 and side wall 442. The upper display frame section 410 and lower display frame section 412 each have an L-shaped cross-section. The L-shaped cross-sections of upper display frame section 410 and lower display frame section 412 enable each section to be generally rigid and to resist bending.

Figure 6C:
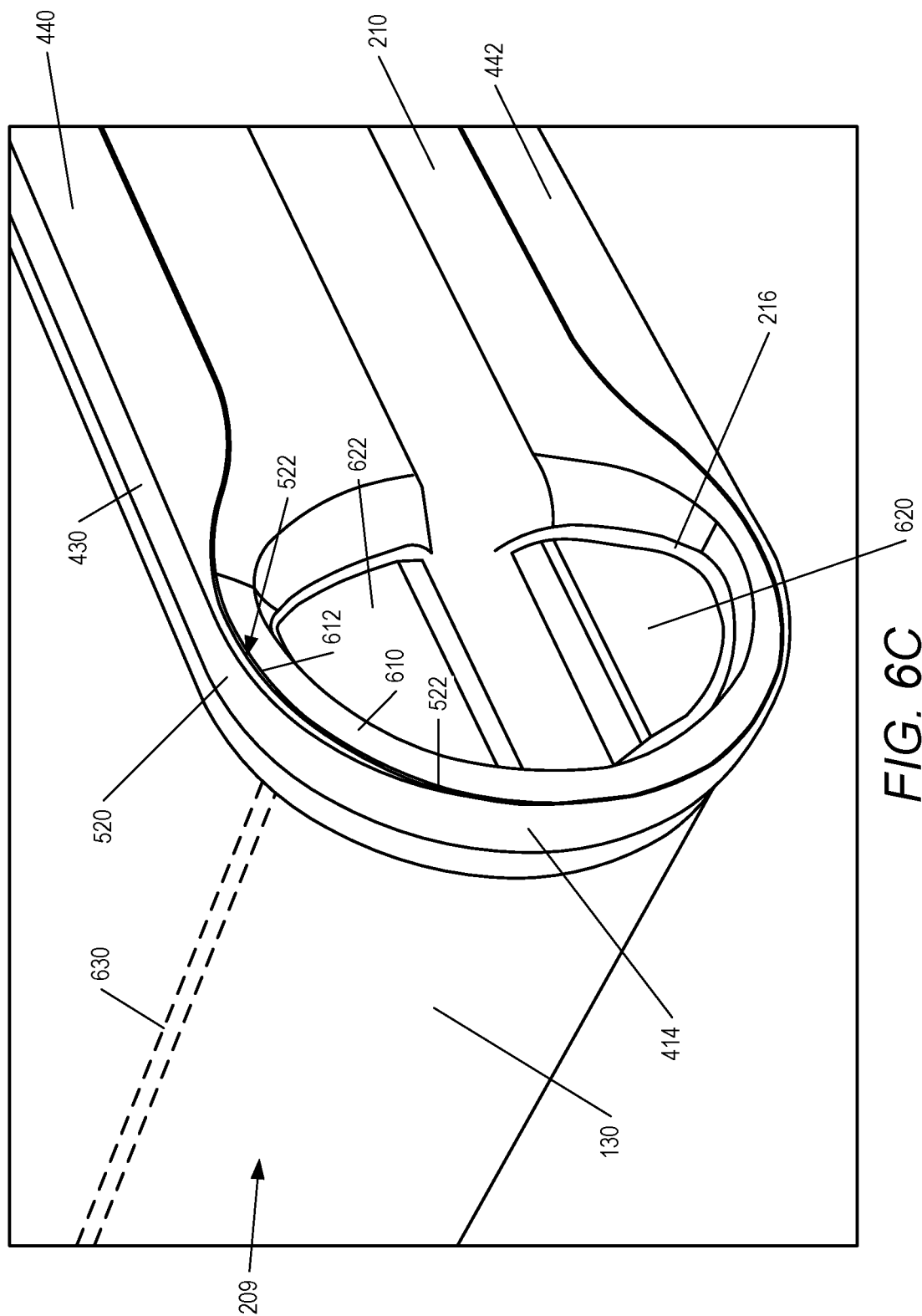
FIG. 6C is an enlarged perspective view of the hinge area of a mobile device in a folded position, according to one or more embodiments.

FIG. 6C illustrates details of housing hinge section 216 of mobile device 100 in a fully folded position. Housing hinge section 216 includes a flexible outer shell 610 that is integral with housing 210. Pistons 620 and 622 are pivotally coupled to each other and surrounded by outer shell 610. Outer shell 610 has an outer surface 612. In one embodiment, outer shell 610 can include a series of pivotally coupled links 630 (only one of which is shown in FIG. 6C) that further enhance the flexibility of housing hinge section 216. Links 630 extend across the width of housing 210, between sides 230 and 232 (FIG. 2B) and are located behind a central portion of display 130. Hinge 414 wraps around outer shell 610 with the inner surface 522 of hinge 414 adjacent to and in contact with outer surface 612. The flat cross-section of hinge 414 enables the hinge to be flexible and to bend around outer shell 610.

FIG. 7A illustrates a partial cross-sectional view of a first example mobile device 100 taken along section line A-A (FIG. 2A). Section line A-A passes through hinge 414. FOLED display 130 is mounted in cavity 310 of housing 210. The depth of cavity 310 is defined by the height of rim 312. FOLED display 130 includes an active area 710 and an inactive area 712. Active area 710 is the area of FOLED display 130 that emits light, and inactive area 712 is the area of FOLED display 130 that does not emit light. Upper wall 430 of hinge 414 extends over and covers the outer peripheral edge 330 of display 130 to protect the outer peripheral edge 330 from any upward peeling away from housing 210 and damage.

Upper wall 430 extends over and covers the outer peripheral edge 330 within inactive area 712. Inner peripheral edge 444 is located over display 130 adjacent to outer peripheral edge 330. Rim 312 is adjacent to and surrounds outer peripheral edge 330. Inner surface 522 of hinge 414 is adjacent to the outer surface 612 of housing hinge 216. Hinge 414 has a flat cross-section. The flat cross-section of hinge 414 enables the hinge to be flexible and to bend.

Turning to FIG. 7B, a partial cross-sectional view of a first example mobile device 100 taken along section line B-B (FIG. 2A) is shown. Section line B-B passes through lower display frame section 412. Housing 210 further includes a groove 720 that is located in an upper portion of left side 232. While not shown in FIG. 7B, a portion of groove 720 also extends along top side 226 (FIG. 2B) and bottom side 228 (FIG. 2B) of housing 210. Another groove 720 extends along top side 226, right side 230 (FIG. 2A) and left side 232 of housing 210. Side wall 442 is located in groove 720 and coupled to left side 232 of housing 210 by an adhesive 730. In an optional embodiment, upper wall 430 is coupled to housing 210 by an adhesive 732. Lower display frame section 412 of display frame 250 has an L-shaped cross-section formed by side wall 442 and upper wall 430. Similarly, upper display frame section 410 also has an L-shaped cross-section.

While not shown in FIG. 7B, side wall 442 is also located in groove 720 and retained to bottom side 228 and right side 230 of housing 210 by adhesive 730. Similarly, side wall 440 (FIG. 5A) of the upper display frame section 410 is also located in groove 720 and retained to top side 226, right side 230, and left side 232 of housing 210 by adhesive 730.

According to one aspect of the disclosure, display frame 250 protects the outer peripheral edges 330 of display 130 from damage. Display frame 250 prevents a user from lifting, pulling or peeling the outer peripheral edges 330 of display 130. Display frame 250 also prevents damage to display 130 when mobile device 100 is dropped or subjected to shock.

Figure 8A:
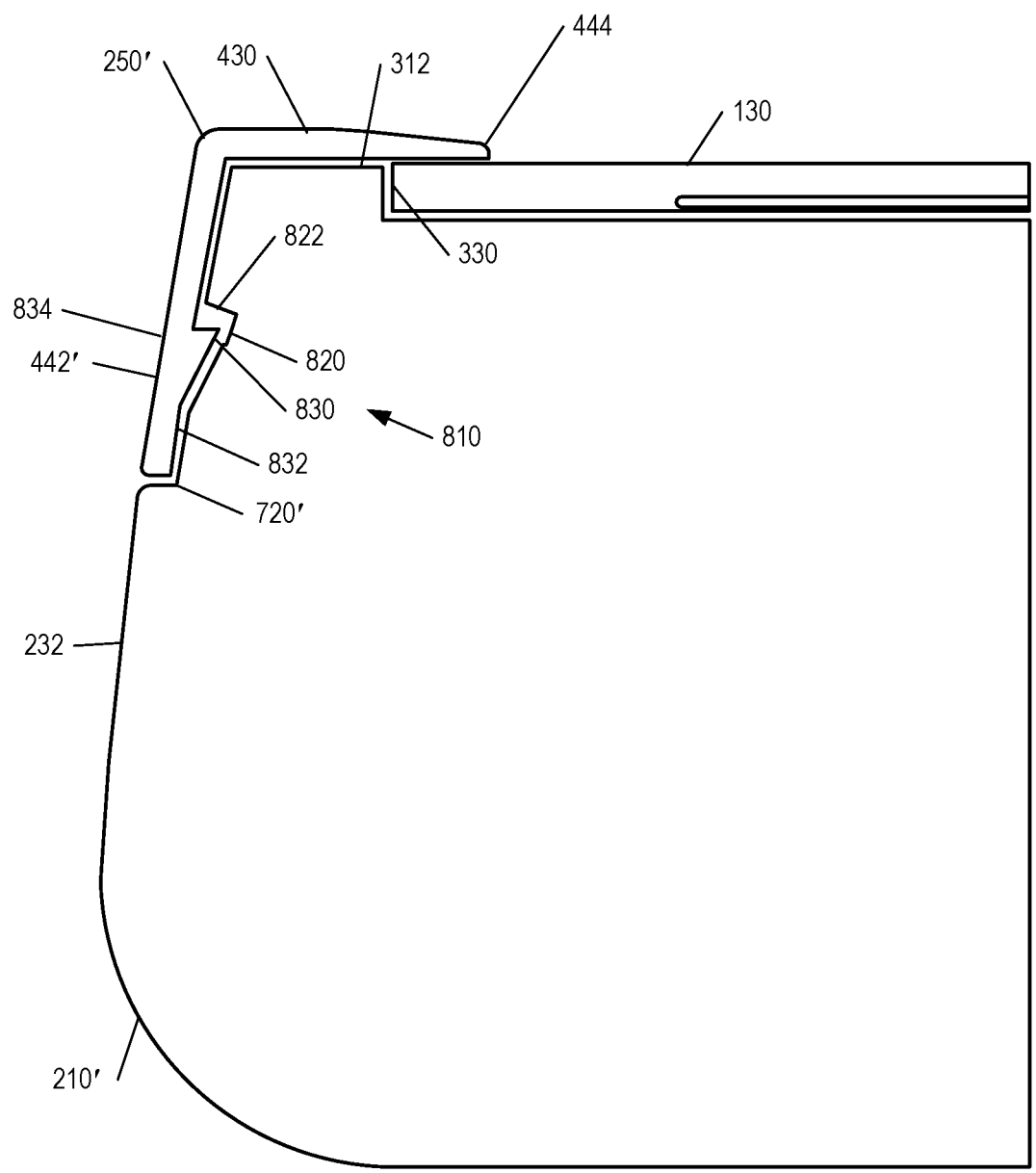
FIG. 8A is a partial cross-sectional view of a second example mobile device, according to one or more embodiments.

Referring to FIG. 8A, a partial cross-sectional view of a second example mobile device is shown. In FIG. 8A, display frame 250' is retained to housing 210' by a retention mechanism 810. Retention mechanism 810 includes a notch 820, lip 822, and a laser weld 830.

Housing 210' further includes notch 820 that extends inwardly from groove 720' into side 232. A lip 822 is defined by notch 820 and is located above notch 820. Laser weld 830 is formed on an inside surface 832 of side wall 442'. Lip 822 prevents laser weld 830 from moving upwardly out of notch 820. According to one aspect of the disclosure, after display frame 250' is mounted over display 130 and housing 210', the side wall 442' of housing 210' is positioned in groove 720'. A laser can be used to heat a portion of outer surface 834 of side wall 442', causing side wall 442' to partially melt, deform and form laser weld 830.

Figure 8B:
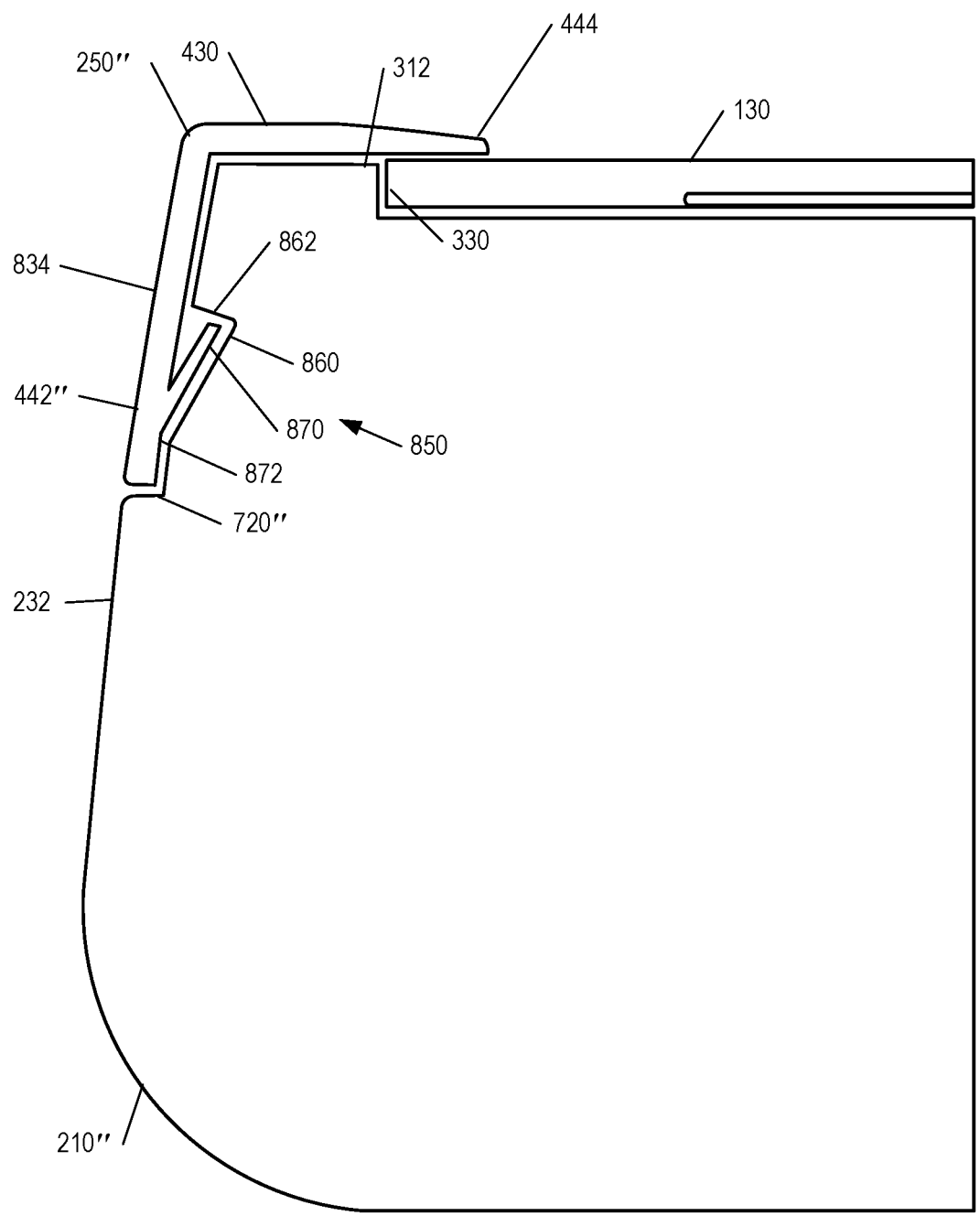
FIG. 8B is a partial cross-sectional view of a third example mobile device, according to one or more embodiments.

With reference to FIG. 8B, a partial cross-sectional view of a third example mobile device is shown. In FIG. 8B, display frame 250" is retained to housing 210" by a snap-fit mechanism 850. Snap-fit mechanism 850 includes a notch 860, lip 862, and a projection 870.

Housing 210" further includes notch 860 that extends inwardly from groove 720" into side 232". A lip 862 is defined by notch 860 and is located above notch 860. Projection 870 is formed on an inside surface 872 of side wall 442". Lip 862 prevents projection 870 from moving upwardly out notch 860. According to one aspect of the disclosure, after display frame 250" is mounted over display 130 and housing 210", the side wall 442" of housing 210" can pressed downwardly until side wall 442" is seated in groove 720". At the same time, projection 870 snaps into notch 860 retaining display frame 250" to housing 210".

Figure 9:
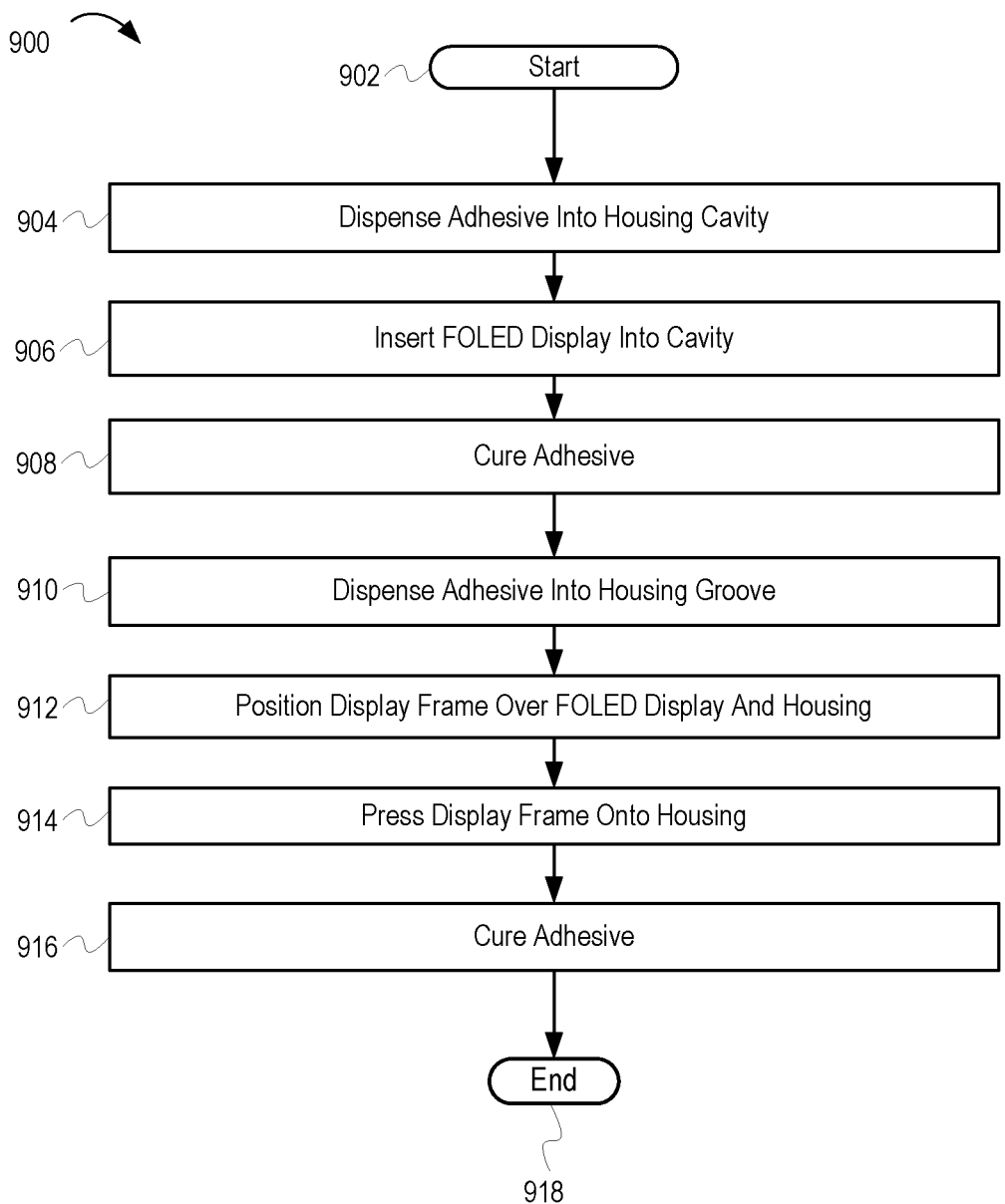
FIG. 9 depicts a flowchart of a method of making a mobile device with a FOLED display, according to one or more embodiments.

FIG. 9 depicts a method 900 for manufacturing a mobile device with a display frame, according to one or more embodiments. The description of method 900 will be described with reference to the components and examples of FIGS. 1-8B. The operations depicted in FIG. 9 can be performed by a processor executing program code for manufacturing a mobile device with a display frame.

With specific reference to FIG. 9, method 900 begins at the start block 902. At block 904, adhesive 340 is dispensed onto selective locations of inner surface 314 within cavity 310 of housing 210. FOLED display 130 is inserted into cavity 310 with the back surface 320 contacting adhesive 340 (block 906). Adhesive 340 is cured (block 908). Adhesive 730 is dispensed into groove 720 (block 910). Display frame 250 is positioned over FOLED display 130 and housing 210 (block 912). Display frame 250 is pressed down onto housing 210 such that side wall 442 moves into groove 720 and contacts adhesive 730 (block 914). Adhesive 730 is cured (block 916). Method 900 ends at end block 918.

In the above-described method of FIG. 9, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A display frame comprising:
   a first display frame section and a second display frame section; and
   a flexible hinge section extending between and coupling the first display frame section and the second display frame section, the flexible hinge section operating as a hinge enabling the first and second display frame sections to bend relative to each other;
   the first display frame section, the second display frame section and flexible section comprising an upper wall integral to the first display frame section, the flexible hinge section, and the second display frame section, extending contiguously around a top perimeter of the display frame, the upper wall has an inner edge that defines a central opening integral to the first display frame section, the second display frame section, and the flexible hinge section, the upper wall providing the flexible hinge section between the first display frame section and the second display frame section, the inner edge of the upper wall for partially covering an outer peripheral edge of a flexible display with which the display frame is to be used to protect the outer peripheral edge of the flexible display;
   the first display frame section having a first side wall extending perpendicularly downward from the upper wall; and
   the second display frame section having a second side wall extending perpendicularly downward from the upper wall;
   wherein the first side wall and the second side wall do not extend in a region of the flexible hinge section; and
   wherein the first and second display frame sections each have an L-shaped cross-section with the first side wall and the second side wall, respectively, enabling each frame section to be generally rigid and to resist bending.

2. The display frame of claim 1, wherein the flexible hinge section has a flat cross-section, the flat cross-section enabling the flexible hinge section to bend.

3. The display frame of claim 1, wherein the first wall partially extends along the first display frame section and the second display frame section.

4. The display frame of claim 1, wherein the display frame is incorporated into a mobile device, the mobile device comprising:
   a housing;
   the flexible display coupled to the housing, the flexible display having the outer peripheral edge; and
   the display frame coupled to the housing.

5. The display frame of claim 4, wherein the housing, the flexible display, and the display frame are bendable between an open position and a folded position in which a top surface of the flexible display faces outwards and opposed bottom surfaces of the housing face each other.

6. The display frame of claim 4, wherein the housing further comprises a first side, a second side, a third side and a fourth side and the display frame further comprises a second wall extending from the first wall in the first display frame section and a third wall extending from the first wall in the second display frame section, the second wall coupled to the first side, the second side and the third side and third wall coupled to the first side, the second side and the fourth side.

7. The display frame of claim 4, wherein the display frame is coupled to the housing by at least one of:
   an adhesive;
   at least one weld; and
   a snap-fit mechanism.

8. The display frame of claim 7, wherein the display frame is coupled to the housing by the snap-fit mechanism, the snap-fit mechanism comprising:
   a first projection extending from the first wall in the first display frame section;
   a second projection extending from the second side wall in the second display frame section;
   a first groove defined in the housing;
   a second groove defined in the housing; and
   the first projection mating with the first groove and the second projection mating with the second groove.

9. The display frame of claim 1, wherein the display frame is formed by metal injection molding.

10. The display frame of claim 1, wherein the display frame is formed from an alloy of nickel and titanium.

11. A mobile device comprising:
a housing;
a flexible display coupled to the housing, the flexible display having an outer peripheral edge; and
a display frame coupled to the housing, the display frame comprising:
  a first display frame section and a second display frame section; and
  a flexible hinge section extending between and coupling the first display frame section and the second display frame section, the flexible hinge section operating as a hinge enabling the first and second display frame sections to bend relative to each other;
  the first display frame section, the second display frame section and flexible section comprising an upper wall integral to the first display frame section, the flexible hinge section, and the second display frame section, extending contiguously around a top perimeter of the display frame, the upper wall has an inner edge that defines a central opening integral to the first display frame section, the second display frame section, and the flexible hinge section, the upper wall providing the flexible hinge section between the first display frame section and the second display frame section, the inner edge of the upper wall partially covering the outer peripheral edge of the flexible display to protect the outer peripheral edge of the flexible display;
  the first display frame section having a first side wall extending perpendicularly downward from the upper wall; and
  the second display frame section having a second side wall extending perpendicularly downward from the upper wall;
  wherein the first side wall and the second side wall do not extend in a region of the flexible hinge section; and
  wherein the first and second display frame sections each have an L-shaped cross-section with the first side wall and the second side wall, respectively, enabling each frame section to be generally rigid and to resist bending.

12. The mobile device of claim 11, wherein the flexible hinge section has a flat cross-section, the flat cross-section enabling the flexible hinge section to bend.

13. The mobile device of claim 11, wherein the first wall partially extends along the first display frame section and the second display frame section.

14. The mobile device of claim 13, wherein the housing further comprises a first side, a second side, a third side and a fourth side, the second wall coupled to the first side, the second side and the third side, the third wall coupled to the first side, the second side and the fourth side.

15. The mobile device of claim 11, wherein the display frame is coupled to the housing by at least one of:
an adhesive;
at least one weld; and
a snap-fit mechanism.

16. The mobile device of claim 15, wherein the display frame is coupled to the housing by the snap-fit mechanism, the snap-fit mechanism comprising:
a first projection extending from the first wall in the first display frame section;
a second projection extending from the third wall in the second display frame section;
a first groove defined in the housing;
a second groove defined in the housing; and
the first projection mating with the first groove and the second projection mating with the second groove.

17. The mobile device of claim 11, wherein the housing, the flexible display, and the display frame are bendable between an open position and a folded position in which a top surface of the flexible display faces outwards and opposed bottom surfaces of the housing face each other.

* * * * *